United States Patent [19]
Eilertson

[11] 3,918,833
[45] Nov. 11, 1975

[54] CIRCULATION CONTROL ROTOR HUB USING TEACUP CAM AND PUSHROD VALVES

[76] Inventor: Warren H. Eilertson, 3931 L'Enfant Drive, Fort Washington, Md. 20022

[22] Filed: Jan. 11, 1974

[21] Appl. No.: 432,796

[52] U.S. Cl. ................................................ 416/20
[51] Int. Cl.² .................... B64C 27/18; B64C 15/08
[58] Field of Search .............................. 416/20, 90

[56] References Cited
UNITED STATES PATENTS

| | | | |
|---|---|---|---|
| 1,982,968 | 12/1934 | Stalker | 416/20 |
| 2,686,567 | 8/1954 | Costa | 416/20 |
| 3,039,537 | 6/1962 | Heidelberg | 416/20 |
| 3,211,397 | 10/1965 | Laing et al. | 416/20 |
| 3,525,576 | 8/1970 | Dorand | 416/20 |
| 3,535,577 | 8/1970 | Cheeseman | 416/20 |
| 3,713,750 | 1/1973 | Williams | 416/20 |
| 3,816,019 | 6/1974 | Norman et al. | 416/20 |

FOREIGN PATENTS OR APPLICATIONS

| | | | |
|---|---|---|---|
| 907,625 | 3/1954 | Germany | 416/20 |
| 634,332 | 3/1950 | United Kingdom | 416/20 |

Primary Examiner—Everette A. Powell, Jr.
Attorney, Agent, or Firm—R. S. Sciascia; Q. E. Hodges

[57] ABSTRACT

A circulation control rotor (CCR) hub having pushrod valves at the inlet to each blade air channel; the valves are operated by either of two cams that have profiles which approximate teacups. One cam is circular in horizontal cross section and provides cyclic lift control air once per revolution; the other cam is oval in horizontal cross section and provides cyclic lift control air twice per revolution. The cams are translatable horizontally and vertically to allow the cam followers to ride on the desired profile.

4 Claims, 3 Drawing Figures

CIRCULATION CONTROL ROTOR HUB USING TEACUP CAM AND PUSHROD VALVES

The invention described herein may be manufactured and used by or for the Government of the United States of America for governmental purposes without the payment of any royalties thereon or therefor.

BACKGROUND OF THE INVENTION

The present invention relates to the field of circulation control rotor (CCR) helicopters such as shown in U.S. Pat. No. 3,713,750. As is well known, the blades of a CCR helicopter are rigidly fixed to the hub; the only moving parts are those that are associated with the hub valve mechanism that produces the pulses of air that are fed to the rotor blades. The valve mechanism must be simple and rugged, since it will be subjected admitted to many thousands of cycles of operation during its lifetime; it must also be as small as possible, since a large hub is a source of excessive drag losses during flight. Desirably, a CCR hub valve should be based on existing valve technology as much as possible in order to avoid as many developmental problems as possible. Further, a valve that makes use of prior art components will experience a greater reliability throughout its period of development and use.

The prior art shows manay CCR hub valves, all of which are rather complex and hence difficult to transform from the drawing board to a piece of flight weight hardware having the requesite reliability. Furthermore, many of the prior art valves do not provide for complete closure of the entrance to the blade air channel; while the entrances are rarely if ever completely closed, a valve which permits complete closure exhibits linear control characteristics over the part of its travel immediatelay prior to closure. This means that the control system which governs the position of the valve operating member (i.e., the "teacup" cam of the present invention) can also be linear, resulting in a simpler control system.

SUMMARY OF THE INVENTION

Briefly, the present invention comprises a series of poppet valves, one at the entrance to each blade air channel. The valves are spring biased to an open position and are closed by either of two non-rotating cams within the hub. The cams are mounted in such a manner that they can be translated horizontally as well as vertically within the hub. One cam is circular in horizontal cross section; when this cam is translated horizontally it causes the generation of unbalanced cyclic lift once per revolution. The other cam is oval and generates cyclic lift twice per revolution. Azimuthal positioning of the cyclic lift is achieved by rotating the shaft on which the cams are mounted. The cams are translated vertically to vary the amount of air delivered to the blades.

OBJECTS OF THE PRESENT INVENTION

Accordingly, it is an object of the present invention to provide a hub valve for a circulation control rotor wherein each blade air channel has its own poppet valve.

It is a further object of the present invention to provide a hub valve for a circulation control rotor wherein the poppet valves are operated by one of a plurality of cams on the same shaft.

Other objects and advantages of the present invention will be obvious from the following specification and accompanying drawings.

DESCRIPTION OF THE PREFERRED EMBODIMENT

Figure 1:
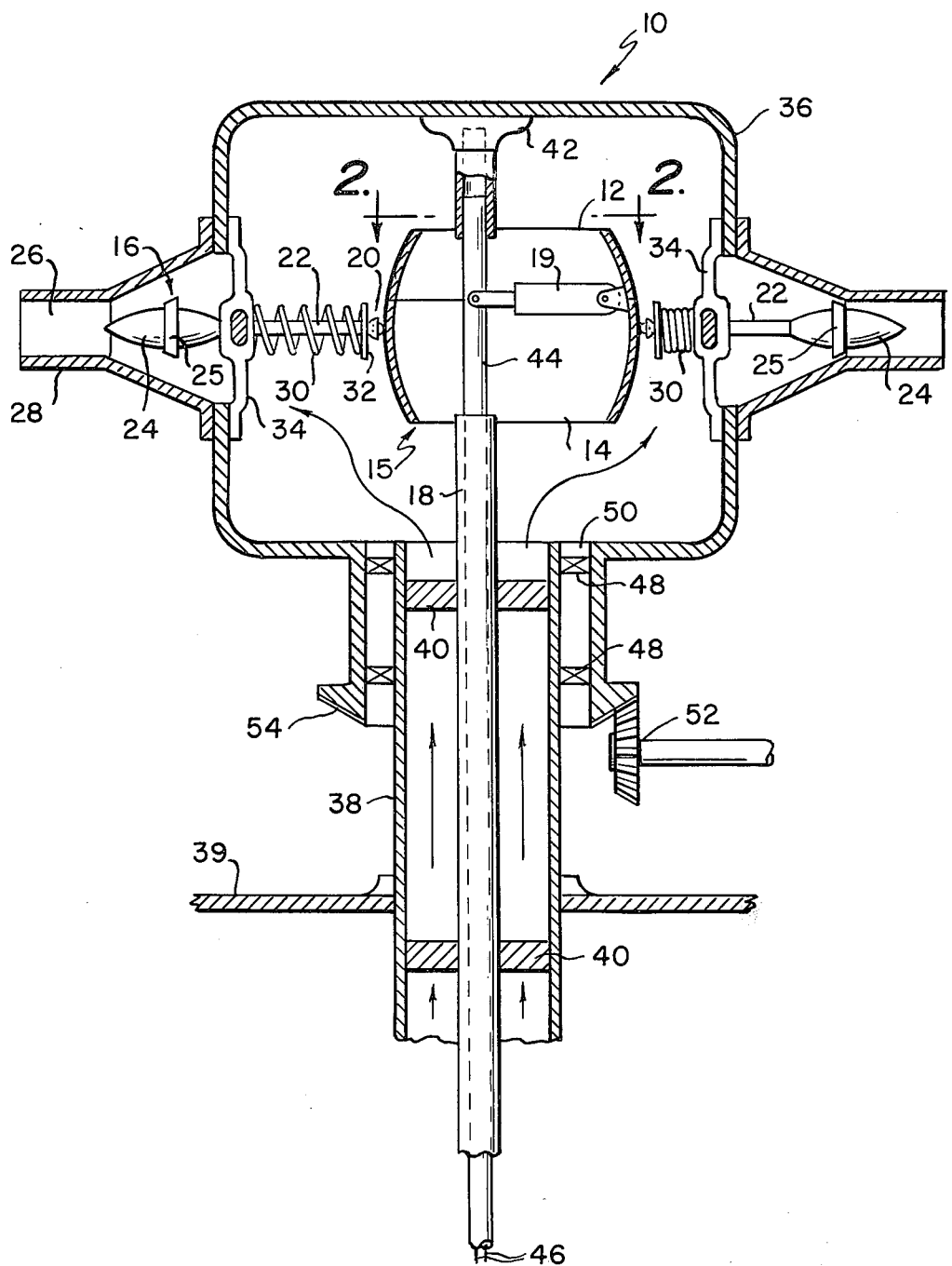
FIG. 1 is a side section view of the hub valve of the present invention.

FIG. 1 shows a hub 10 which incorporates a valve assembly according to the present invention. The valve assembly is comprised of cams 12 and 14, which comprise cam assembly 15, and poppet valves 16. Cam assembly 15 is attached to shaft 44 by means of hydraulic cylinders or other extensible members 19, which are at a right angle to each other and perpendicular to the axis of the shaft. Shaft 44 can be translated up and down in order to bring the desired part of the cams in contact with cam follower wheels 20 of poppet valves 16, as will be explained later; it can also be rotated, for a purpose to be explained later.

Poppet valves 16 are comprised of a stem 22 having a cam follower wheel 20 on their inner ends and a valve head 24 on their outer ends. Valve heads 24 are shaped to have minimum flow disturbance when fully open. However, they must provide some pressure loss when the valves are partially open; without some pressure loss the valve will not have good control response characteristics. For this reason valve heads 24 are shown as having spoilers on trips 25 on their outer surfaces. These trips 25 simulate a sharp edge orifice when the valve is partially open, providing the required amount of pressure loss; however, when the valve is fully open they do not contribute any significant losses. Coil springs 30, held in place by means of retainers 32, surround each valve stem 22; these springs bias the valves in an open position, to be later closed by one of the cams. Valves 16 are supported and guided by members 34 which span the entrances to blades 28 but which do not block the flow of air or other fluid into blades 28. Members 34 are attached to the inside of hub casing 36 by bolting, welding, etc.

Blades 28 are attached to hub outer casing 36 by any convenient method, since the method of attaching the blades has no bearing on the present invention. FIG. 1 shows a hub having two blades; however, it is to be understood that any number of blades can be employed in a hub which utilizes the valve of the present invention.

Cam assembly 15 can be rotated and translated along the axis of guide shaft 18 as follows: Stationary guide shaft 18 is attached to stationary outer casing 38 by struts 40; support 42, which is an extension of guide shaft 18, is attached to hub outer casing 36. Outer casing 38 is attached to and supported by helicopter body 39 as shown. Guide shaft 18 and support 42 carry central shaft 44 within them in such a manner that it can be translated axially and rotated by means not shown. Hydraulic cylinders or other extensible members 19 are attached at one end to control shaft 44 and at the other to cam assembly 15; control shaft 44 carries within it the means 46 by which these cylinders 19 are operated. Thus control shaft 44, cam assembly 15, and hydraulic cylinders 19 move as a unit although cam assembly 15 can be translated with respect to control shaft 44 by hydraulic cylinders 19.

Hub outer casing 36 is rotatably supported on stationary outer casing 38 by bearings 48; seals 50 prevent leakage of air past bearing 48. Hub assembly 10 is rotated by any desired means, represented schematically by drive gear 52 which meshes with teeth 54 on outer casing 36.

Figure 2:
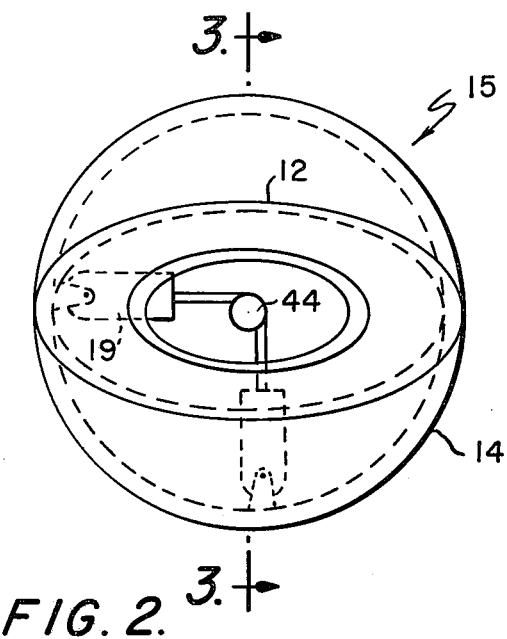
FIG. 2 is taken along line 2—2 in FIG. 1.
Figure 3:
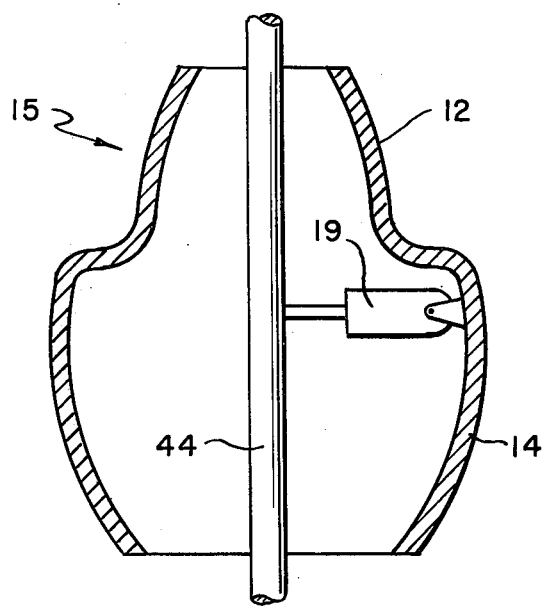
FIG. 3 is taken along line 3—3 in FIG. 2.

FIGS. 2 and 3 show cross sections of cams 12 and 14. As can be seen, cam 12 is approximately oval in cross section while cam 14 is circular. Both cams are shown centered on control shaft 44; they are moved from this position by hydraulic cylinders 19, as will be explained later. The profiles of the cams will be determined by experiment for each application; however, the vertical curvature of the cams, as seen in FIG. 3, will allow a certain amount of latitude in their design.

Operation of the valve is as follows: Air or other lift control fluid comes up inside stationary outer casing 38 and then flows into blades 28 as shown by the arrows in FIG. 1, and the rotor is rotated by drive gear 52. Hydraulic cylinders 19 are used to bring cam assembly 15 to the center of the hub which is the position for hover with no wind, and control shaft 44 is translated until cam follower wheels 20 are on the highest part of cam 14. In this position all poppet valves 16 are closed the maximum amount; as the outer hub casing 36 and blades 28 are rotated around stationary cam assembly 15 there is no cyclic variation in the amount of air admitted to each blade. When cyclic lift is desired cam assembly 15 is translated horizontally as shown in FIG. 1 (by hydraulic cylinders 19) to the azimuthal position opposite that at which the cyclic lift is desired. In practice, however, it may be found that the cam must be offset to a position other than opposite that at which the cyclic lift is desired; this can be determined experimentally. With the cams off-center as shown, one valve will be opened more than the valve opposite it and consequently one blade will develop more lift than the one opposite it. Since hydraulic cylinders 19 can translate cam assembly 15 to any azimuthal position, cyclic lift can be generated at any azimuthal position. The amount by which the cam is offset from the center of the hub determines the amount of cyclic lift that is developed.

Collective lift developed by the rotor is determined by the diameter of the cam where it is contacted by cam follower wheels 20, as well as by the amount of air that is supplied through casing 38. If control shaft 44 is translated upward from its position as shown in FIG. 1, cam follower wheels 20 will move radially inward and each valve will be opened by the same additional amount; the collective lift developed by the rotor will thus be increased without noticeably affecting the cyclic lift.

When cam assembly 15 is in the position described above, pulses of air are fed to the rotor blades at only one azimuthal position. However, in order to damp out vibrations and spread lift over more of the disc, it becomes desirable to introduce air pulses into the rotor at more than one position. This is done by using cam 12. Control shaft 44 is translated downward so that cam follower wheels 20 are now on cam 12. If cam 12 is at the center of the hub, equal amounts of cyclic lift will be developed on two opposite sides of the disc when the cam follower wheels are on the flat sides of the oval. By translating the cam parallel to its short axis (using actuators 19), the amounts of cyclic lift will be made unbalanced; one of the flat sides will be closer to the center of the hub than the other, which will cause the valves to be opened more when they ride on that side than when they ride on the other flate side. Thus one side of the disc will develop a greater amount of cyclic lift than the other. The greater amount of cyclic lift is used to produce horizontal flight, and the smaller amount is used to spread lift over more of the disc, cancel out vibrations, etc. As stated earlier, shaft 44 is made rotatable; this allows cam 12 to be rotated to its proper azimuthal position for the production of the unbalanced cyclic lifts. Translating shaft 44 downward will cause valves 16 to open an additional equal amount, increasing the collective lift of the rotor.

Obviously many modifications and variations of the present invention are possible in the light of the above teachings. It is therefore to be understood that within the scope of the appended claims the invention may be practiced otherwise than as specifically described.

What is claimed is:
1. A circulation control rotor comprising:
   a hub;
   a plurality of hollow blades attached to said hub;
   cam operated poppet valves at the entrances to said hollow blades;
   a plurality of cams on a shaft within said hub which operate said valves; and
2. A circulation control rotor as in claim 1 including means to translate said cam in a plane perpendicular to said shaft.
3. A circulation control rotor comprising:
   a rotatable hub;
   a plurality of hollow blades attached to said hub;
   cam operated valves at the entrances to said hollow blades;
   a plurality of cams on a common shaft to operate said valves in a plurality of distinct cyclic variations; and
   means to rotate and translate said shaft about and along its axis.
4. A circulation control rotor as in claim 3 including means to translate said cams in a plane perpendicular to said shaft.

* * * * *